US012558710B2

(12) United States Patent
Grupp et al.

(10) Patent No.: US 12,558,710 B2
(45) Date of Patent: Feb. 24, 2026

(54) PARCEL SINGULATION YIELD CORRECTING SYSTEM AND METHOD

(71) Applicant: Körber Supply Chain LLC, DFW Airport, TX (US)

(72) Inventors: Francisco Grupp, Trophy Club, TX (US); Michael D. Carpenter, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 624 days.

(21) Appl. No.: 18/006,488

(22) PCT Filed: Jul. 31, 2020

(86) PCT No.: PCT/US2020/044386
§ 371 (c)(1),
(2) Date: Jan. 23, 2023

(87) PCT Pub. No.: WO2022/025909
PCT Pub. Date: Feb. 3, 2022

(65) Prior Publication Data
US 2023/0294134 A1 Sep. 21, 2023

(51) Int. Cl.
*B07C 1/04* (2006.01)

(52) U.S. Cl.
CPC ...................................... *B07C 1/04* (2013.01)

(58) Field of Classification Search
CPC .............. B07C 1/04; B07C 5/02; B07C 7/005
See application file for complete search history.

(56) References Cited

U.S. PATENT DOCUMENTS 6,484,886 B1 * 11/2002 Isaacs .................... B65G 47/68 209/583
7,012,210 B2 * 3/2006 Kibbler ..................... B07C 1/02 198/444

(Continued)

FOREIGN PATENT DOCUMENTS

FR 3032364 A1 8/2016
WO 2004089546 A2 10/2004

OTHER PUBLICATIONS

European Patent Office; International Search Report; Mar. 17, 2021; entire document.

*Primary Examiner* — Patrick H Mackey
(74) *Attorney, Agent, or Firm* — Price Heneveld LLP

(57) ABSTRACT

A parcel processing system includes a conveyor segment to transport a stream of singulated items received from a parcel singulator, an imaging device to discretely capture an image of each item of the stream as transported, an automatic recognition system to process the captured images and utilize a binary classification model to generate a classifier output designating each image as positive or negative, and an operator station to selectively receive a sequence of images from the automatic recognition system to enable an operator to validate the classifier output from the received images, for identifying false positives and/or false negatives therefrom, the parcel processing system being configured to process items associated with images that identified as false positives at the operator station as correctly singulated items and/or to process items associated with images that are identified as false negatives at the operator station as incorrectly singulated items.

20 Claims, 4 Drawing Sheets

(56) References Cited

U.S. PATENT DOCUMENTS

| | | | | |
|---|---|---|---|---|
| 10,934,101 | B1 * | 3/2021 | Sines | G06N 3/04 |
| 11,479,418 | B2 * | 10/2022 | Zatopek | B07C 5/3422 |
| 11,492,210 | B2 * | 11/2022 | Wagner | B65G 47/49 |
| 11,507,548 | B1 * | 11/2022 | Yekollu | G06N 5/01 |
| 11,851,288 | B2 * | 12/2023 | Dwivedi | B07C 5/02 |
| 2004/0026300 | A1 | 2/2004 | Kibbler et al. | |
| 2021/0047132 | A1 * | 2/2021 | Sines | G06N 3/09 |
| 2021/0101755 | A1 * | 4/2021 | Wagner | B65G 47/49 |
| 2022/0331840 | A1 * | 10/2022 | Paulson | G06V 20/10 |
| 2022/0331841 | A1 * | 10/2022 | Filler | G06K 7/1482 |

* cited by examiner

PARCEL SINGULATION YIELD CORRECTING SYSTEM AND METHOD

TECHNICAL FIELD

The present disclosure relates generally to the field of mail and parcel processing, and in particular, to a system and a method for correcting parcel singulation yield.

BACKGROUND

Parcel distribution centers typically receive large quantities of parcels or packages, often widely varying in size, that are unloaded en masse from trucks or other transportation media. The packages merge into a central area in a random order and orientation where they are oriented and aligned in a single file by singulators for further processing. The further processing may include, for example, scanning of destination-identifying bar codes and sortation to destination areas for subsequent loading onto trucks or other transportation media.

State of the art techniques in parcel singulation exhibit varying degrees of accuracy. When more than one parcel is presented as a single parcel, this represents an error in singulation, commonly called a "double feed", even though more than two parcels can be involved in each instance. When a singulation error occurs, multiple parcels tend to be processed as one, which typically results in the mis-sorting of at least one parcel. This, in turn, can result in delayed or even incorrect delivery of goods.

SUMMARY

Briefly, aspects of the present disclosure are directed to a improved technique for detecting and correcting parcel singulation errors.

A first aspect of the present disclosure is directed to a parcel processing system. The parcel processing system comprises a conveyor segment configured to transport a stream of singulated items received from a parcel singulator. The parcel processing system further comprises an imaging device configured to discretely capture an image of each singulated item of the stream of singulated items transported on the conveyor segment. The parcel processing system further comprises an automatic recognition system configured to process the captured images and utilize a binary classification model to generate a classier output designating each image as a positive, representing a singulation error, or as a negative, representing a correct singulation. The parcel processing system further comprises an operator station configured to selectively receive a sequence of images from the automatic recognition system to enable an operator to validate the classifier output for the received images, for identifying false positives and/or false negatives therefrom. The parcel processing system is configured to process items associated with images that are identified as false positives at the operator station as correctly singulated items and/or to process items associated with images that are identified as false negatives at the operator station as incorrectly singulated items.

A second aspect of the present disclosure is directed to a method for processing parcels. The method comprises transporting, on a conveyor segment, a stream of singulated items received from a parcel singulator. The method further comprises capturing an image of each singulated item of the stream of singulated items transported on the conveyor segment. The method further comprises feeding the captured images to an automatic recognition system, whereupon the automatic recognition system processes the captured images and utilizes a binary classification model to generate a classier output designating each image as a positive, representing a singulation error, or as a negative, representing a correct singulation. The method further comprises selectively receiving a sequence of images at an operator station for validating, by an operator, the classifier output for the received images, to identify false positives and/or false negatives therefrom. The method further comprises processing items associated with images that are identified as false positives at the operator station as correctly singulated items and/or processing items with images that are identified as false negatives at the operator station as incorrectly singulated items.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
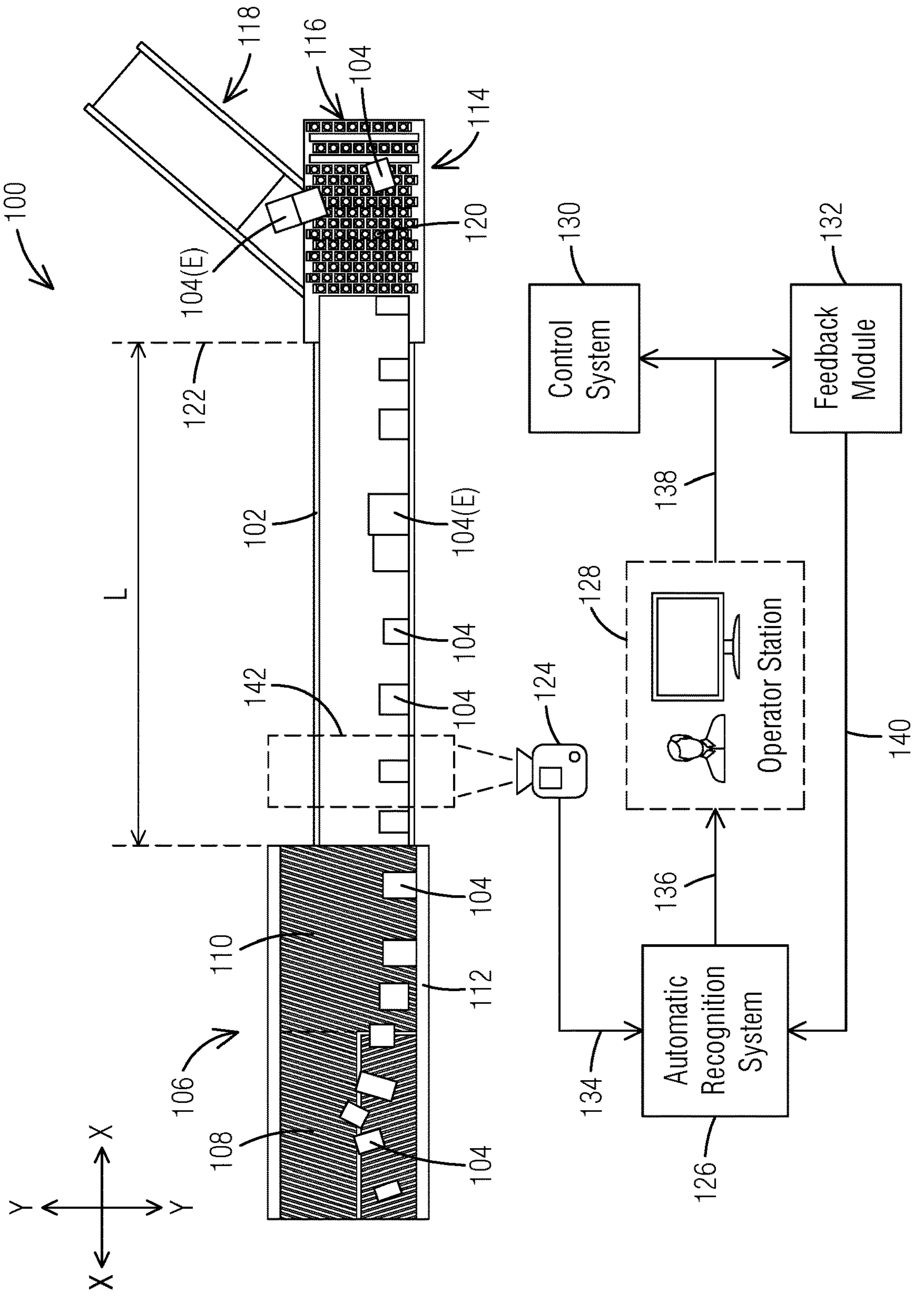
FIG. 1 illustrates a parcel processing system according to an example embodiment.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present disclosure will be described with reference to exemplary non-limiting embodiments.

To prevent delayed or incorrect delivery of goods, it is desirable that errors in singulation are corrected on site. For this, the output of a parcel singulator may be continuously monitored to identify and remove incorrectly singulated items from a stream of singulated items. The monitoring may be done, for example, by positioning one or more operators downstream of the parcel singulator. The operators have the job of visually observing the stream of singulated items coming out of the parcel singulator, typically at a high rate, to identify incorrectly singulated items. Once identified, the incorrectly singulated items may be removed either manually or automatically (for example, via an automatic divert system). Another possibility of monitoring singulation output is to leverage machine vision to recognize incorrectly singulated items so that they can be automatically removed from the stream of singulated items.

The present inventors have devised an improved technique for detecting and correcting errors in parcel singulation. The technique utilizes an automatic recognition system based on captured images of the singulated items received from the parcel singulator. The automatic recognition system utilizes a binary classification model which produces an output designating each image as a positive, representing a singulation error, or as a negative, representing a correct singulation. The classification model may be tuned for a high detection rate at the cost of a high false positive rate. Rather than act on the results of the automatic recognition system alone, the images along with their classifier output from the automatic recognition are presented to a human operator for validation, identify false positives and/or false negatives. Subsequent processing of the items is carried out based on the correction of the false positives and/or false negatives. The present technique provides an improvement over the above-described approaches and is particularly suited to applications that require a lower operator duty cycle and/or a lower rate of failure (either a false positive or false negative).

Turning now to the drawings, FIG. 1 illustrates a parcel processing system 100 according to an example embodiment. The parcel processing system 100 comprises a conveyor segment 102 positioned downstream of a discharge end of a parcel singulator 106 to receive a singulation output from the parcel singulator 106. The conveyor segment 102 may comprise, for example, a belt conveyor. The conveyor segment 102 provides a transport surface to facilitate monitoring and detection of errors in the singulation output prior to subsequent processing, such as sorting. As described in greater detail below, detection of singulation errors is carried out based on automatic recognition of captured images of the singulated items transported on the conveyor segment 102 followed by operator validation of positive results obtained from the automatic recognition. The point 122 by which a decision is established on whether an item is associated with a singulation error is typically located at or near the downstream end of the conveyor segment 102. The conveyor segment 102 may desirably have a length L which is adequate to accommodate a latency between image capture and operator validation.

In the shown configuration, the parcel singulator 106 comprises a merge conveyor 108 that converges a two-dimensional stream of items (or parcels) 104 with spacing in X and Y directions into a single file with spacing only in X direction, followed by an alignment conveyor 110 that aligns the converged stream of items 104 against a wall 112 to align the items. Though not shown, the parcel singulator 106 may additionally comprise an upstream singulation device that converts a bulk flow of items into a two-dimensional stream of items with metered spacing in the transport direction (X direction). The merge conveyor 108 and the alignment conveyor 110 may comprise, for example, angled rollers. The shown configuration of the parcel singulator is exemplary, it being understood that several other types of singulator configurations may be used.

The output of the parcel singulator 106 is typically a one-dimensional stream of singulated items 104, which is received and transported on the conveyor segment 102 for subsequent processing. The term "singulated item" refers to a discretized output from the parcel singulator, which may either be a correctly singulated item, consisting of a single item, or an incorrectly singulated item (also referred to as singulation error or "double feed"), where more than one item is presented as a singulated item. Incorrectly singulated items 104 are identified with the notation (E) in FIG. 1.

An exception handling system 114 may be located downstream of the conveyor segment 102. In the shown example, the exception handling system 114 includes a main conveyor 116 and an extraction conveyor 118 oriented at an angle to the main conveyor 116. The extraction conveyor 118 may be used for extracting incorrectly singulated items 104(E) that are identified using the present technique, as well as for extracting other exceptional items, such as non-conveyable items, among others. The regular or correctly singulated items 104 may be transported along the main conveyor 116 toward a sorting location. The main conveyor 116 may comprise rollers 120, where each roller 120 is configured to rotate about a rotation axis, for transporting the items, and is pivoted about a pivot axis. The pivot angle of the rollers 120 may be controllable for diverting items that are identified as exceptional toward the extraction conveyor 118. The extraction conveyor 118 may comprise a belt conveyor, or a roller conveyor, or combinations thereof, or any other transport mechanism. In one embodiment, a gapping system may be provided downstream of the exception handling system 114, to correct inconsistencies in spacing between the items, for example, resulting from the extraction of exceptional items from the stream, prior to being sent to a sorter. In an alternate embodiment, the sorter itself may be provided with exception handling capability, for example including diverting mechanism such as cross-belts, tilt trays, shoes movable on slats (shoe sorter), among others, for separating exceptional items from regular items.

As shown in FIG. 1, the parcel processing system 100 comprises one or more imaging devices 124, for example including a 2D or a 3D camera, for discretely capturing one or more images for each singulated item 104 being transported on the conveyor segment 102. One or more images may be captured for each singulated item 104 when the item 104 is within a defined image capture window or region 142. The image capture window 142 is typically located near an upstream end of the conveyor segment 102 to minimize the length L of the conveyor segment 102 required to accommodate the latency between image capture and result validation. For each singulated item 104, an image of at least one side and up to all six sides of the item may be captured.

The captured images 134 are communicated to an automatic recognition system 126, typically as digital data comprising pixel information. The automatic recognition system 126 may comprise one or more computers or computing devices including a combination of hardware and/or software specifically configured to process and classify the captured images 134 to detect singulation errors. For example, the automatic recognition system 126 may be provided with image processing hardware, such as a central processing unit (CPU), a graphics processing unit (GPU), a field programmable gate array (FPGA), among others, or any combinations thereof. The automatic recognition system 126 may be configured to perform one or more machine vision based image processing steps on the captured image data, for example but not limited to, filtering, thresholding, segmentation, edge detection, pattern recognition, etc. The automatic recognition system 126 may then use a binary classification model (or "classifier") to generate a classier output designating each image as a positive, representing a singulation error, or as a negative, representing a correct singulation. In some embodiments, the automatic recognition system 126 may be configured to select one or more classification models among several available classification models that represent the system.

Figure 2:
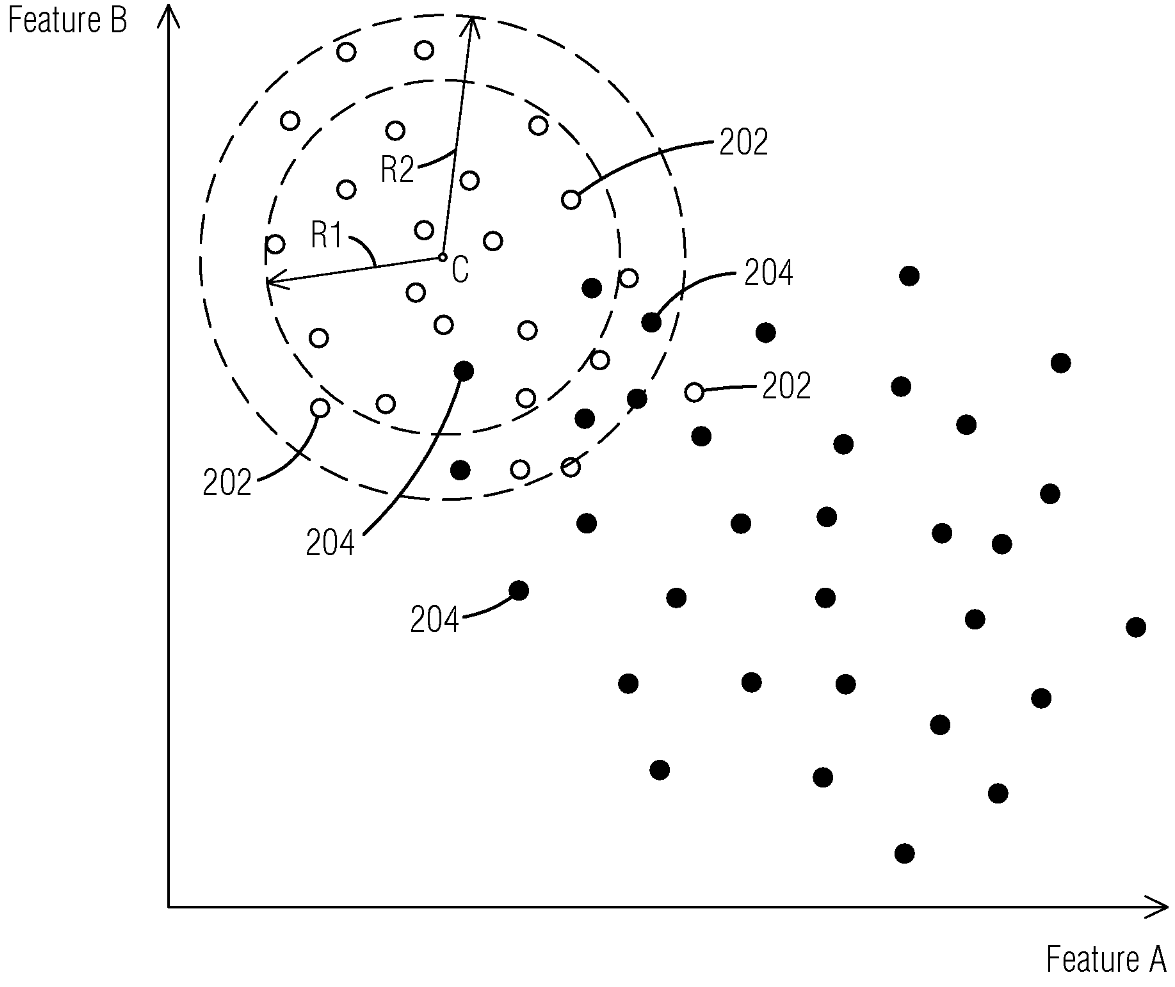
FIG. 2 illustrates a simplified a two-dimensional feature space used in binary classification.

A binary classification model represents a mapping of instances (images) into two classes. In this case, the two classes include a positive class (representing singulation error) and a negative class (representing correct singulation). For a given classification model, the variable distance in feature space between the mapped instances correlates to an ambiguity of the model. As an illustration, a two-dimensional feature space 200 is shown in FIG. 2, it being understood that a classification model may, in practice, utilize a multi-dimensional feature space. Herein, the instances 202 depicted in white are known (validated as ground truth) to belong to the "positive" class while the instances 204 depicted in black are known (validated as ground truth) to belong to the "negative" class. The x-axis and the y-axis respectively represent Feature A and Feature B. As shown, the "positive" and "negative" instances form well-defined clusters in the feature space 200. However, for a classification model to map these instances into the respective classes, a discrimination threshold has to be set, which is a distance in the feature space 200 representing a boundary between the classes. A distance above or below the discrimination threshold represents the determination of a binary result. In terms of this binary classification, each classifier output has the potential to be incorrect, making for a total of four possibilities, namely: true positive, false positive, true negative and false negative.

Referring to FIG. 2, it can be seen that the classifier output can be tuned by changing the discrimination threshold setting. In the shown example, the discrimination threshold is the distance in the feature space 200 from the center C of the "positive" cluster. If the discrimination threshold is set at R1, the total number of true positives detected (i.e., number of instances 202 within the respective circle) is lesser than when the discrimination threshold is set at R2. However, the total number of false positives detected (i.e., number of instances 204 within the respective circle) is higher with the discrimination threshold setting at R2 than at R1.

Figure 3:
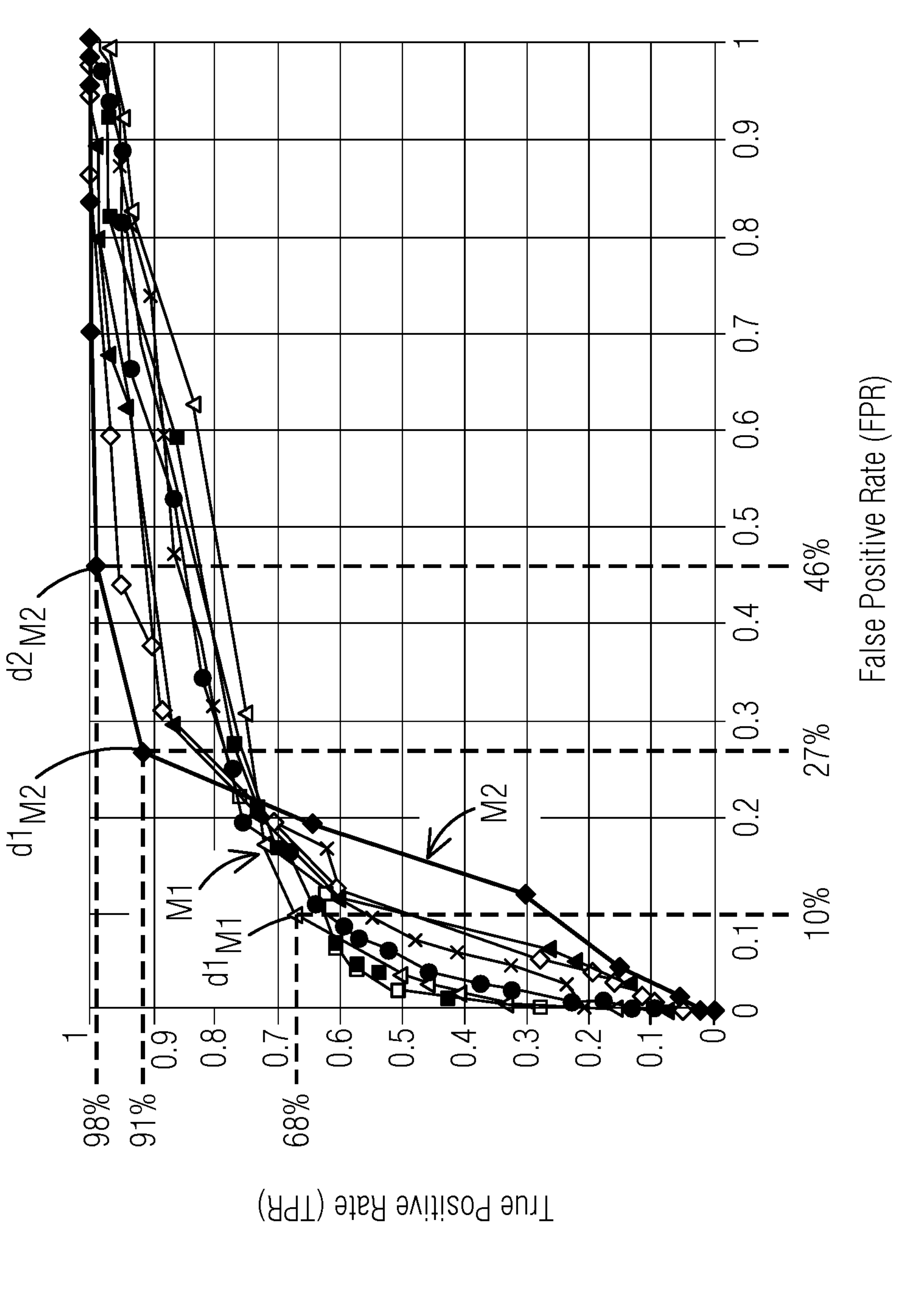
FIG. 3 illustrates receiver operating characteristic (ROC) curves for different binary classification models for detecting singulation error.

FIG. 3 illustrates receiver operating characteristic (ROC) curves for different classification models for detecting singulation error, dealing with images for which "ground truth" (the validated condition for each image) is known. The ROC curve of a classification model is created by plotting "True Positive Rate" (TPR) or "Detection Rate" represented along the y-axis against "False Positive Rate" (FPR) represented along the x-axis, at various discrimination threshold settings. Among the classification models shown, depending on the discrimination threshold setting, the "True Positive Rate," or "Detection Rate," can be increased, but at the expense of "False Positive Rate." For example, among the classification models shown, the model M1 achieves 68% detection rate at the cost of 10% false positive rate for a given discrimination threshold setting $d1_{M1}$, meaning that among the actual singulation errors, 68% would be identified, but among the singulation errors identified, 10% would be false. The classification model M2 achieves 91% detection rate at the cost of 27% false positive rate at a first discrimination threshold setting $d1_{M2}$ and achieves 98% detection rate at the cost of 46% false positives at a second discrimination threshold setting $d2_{M2}$.

The automatic recognition system 126 may be configured to leverage one or more classification models tuned to a discrimination threshold setting that aggressively provides a high detection rate at the cost of a high false positive rate. In one embodiment, this may be achieved by using the one or more classification models at a discrimination threshold setting that is above a knee-point in the ROC curve associated with the respective model. A knee-point in the ROC curve is a point beyond which the curve vector begins to flatten or change in slope toward being asymptotic with the x-axis. Above the knee-point, the false positive rate increases significantly with an increase in detection rate. For example, in the case of the model M2 in FIG. 3, the point defined by the discrimination threshold setting $d1_{M2}$ can be seen to be a knee-point. In accordance with the proposed embodiment, for classifying the images of the singulated items, the model M2 may be tuned to a discrimination threshold setting (e.g. $d2_{M2}$) where the model operates above the knee-point in its ROC curve. In one embodiment, the automatic recognition system 126 may be configured to combine multiple classification models and use yet another classification model to determine when to pick the result of a given classification model. In this case, a best-case ROC curve may be determined based on a combination of the output from the various classification models.

The high detection rate resulting from the above-described setting of the discrimination threshold ensures that singulation errors are captured to a maximum extent. The resulting increase in failure rate (false positives) may be continuously corrected by selectively presenting only the "positive" results from the automatic recognition system 126 to an operator for validation. Thus, the overall failure rate due to both false positives and false negatives is significantly reduced. Furthermore, by having an operator validate only "positive" results from the automatic recognition system 126, the operator duty cycle is also significantly reduced.

Referring back to FIG. 1, the automatic recognition system 126 communicates a sequence of images 136 to an operator station 128. The operator station 128 may comprise one or more computers (e.g., desktops, laptops) or any other computing device or computer terminal configured to receive the classifier output along with the digital image data for the designated positive images 136. The operator station 128 may comprise a combination of image viewing software and hardware as well as I/O devices (e.g., display screen, mouse, keyboard, etc.), to enable one or more human operators to validate the classifier output designation for the received images 136. If the imaging device(s) have captured images of multiple sides of singulated item, it may be likely that some of the images for each item may be more relevant than the others. Although the operator performing the image-based validation would have access to any of the images, the operator may initially be presented the images upon which the classifier output is based.

The sequence of images 136 received at the operator station 128 may comprise both designated positive images and designated negative images. In the described embodiments, the sequence of images 136 received at the operator station 128 selectively consists only of designated positive images. For each classifier output, the automatic recognition system 126 may use the respective classification model to determine a confidence level of the output. For example, the confidence level of a "positive" classifier output for an instance (image) may be quantitively determined as a function of a distance in feature space of that instance from the center of the "positive" cluster, among other factors. For illustration, referring to FIG. 2, instances 202 and 204 that lie within a circle defined by the respective discrimination threshold setting but are located closer to the circumference of the circle are typically associated with a lower confidence level than instances located closer to the center C of the "positive" cluster. In one embodiment, the automatic recognition system 126 may be configured to selectively communicate a sequence of images 136 to the operator station 128 for validation that consists only of images for which the classifier output is associated with a confidence level below a threshold confidence level. In a particularly specific embodiment, the automatic recognition system 126 may be configured to selectively communicate a sequence of images 136 to the operator station 128 that consist only of designated positive images with confidence level below a threshold confidence level. This approach may minimize validation labor while maximizing validation accuracy by ensuring that only a fraction of the "positive" results need to be validated by the operator. In various embodiments, the threshold confidence level may be statically determined or dynamically adjusted to manage operator duty cycle. In other embodiments, the sequence of designated positive images communicated to the operator station for validation may consist of all images for which the classifier output is positive, irrespective of the confidence level of the classifier output.

In the validation process, an operator makes a visual validation that the images actually reflect singulation errors. When the operator identifies a false positive, i.e., determines than an image does not indicate a singulation error, the item associated with that image is processed as a correctly singulated item 104 and is allowed to proceed to subsequent processing, such as sorting. When the operator identifies a false negative, i.e., determines than an image does indicate a singulation error, the item associated with that image is processed as an incorrectly singulated item 104(E). Items 104(E) associated with images that are validated by the operator as truly indicating a singulation error (true positive or false negative) may be extracted from the stream of singulated items 104 by the exception handling system 114 as described above.

As shown in FIG. 1, the parcel processing system 100 may comprise a control system 130 that is configured, among other functions, to control the exception handling system 114 based on the validation results 138 from the operator station 128. The control system 130 may comprise, for example, a controller (e.g., a PLC) coupled to a centralized data processing system having one or more processors, memory, user I/O devices, LAN/WAN/Wireless adapters and I/O adapter connected to control the parcel processing equipment described in FIG. 1. The validation result 138 for each item may be communicated to the control system 130 just before the item reaches the decision point 122. Tracking technology may be used to ensure that results of the automatic recognition and validation process are synchronized with the flow of items.

The described architecture of the parcel processing system 100 makes it possible for multiple human operators to serve the validation workflow of a single parcel singulator. Furthermore, by reducing the operator duty cycle using the described techniques, it is possible for a single operator station 128 or even a single operator to serve the validation workflow of multiple parcel singulators of the parcel processing system 100. In one embodiment, the operator station 128 may located remotely (for example, in a different building or geographic location) from the parcel singulator(s). In some embodiments, the operator station 128 may be co-located with the automatic recognition system 126.

In a further development, the parcel processing system 100 may comprise a feedback module 132 comprising one or more computers with memory configured to store and provide analyses of classifier outputs that are identified as false positives and/or false negatives at the operator station 128. The results 138 from validation would thus present a basis for continued refinement of the automatic recognition system 126 through engineering development and tuning. As the singulation system operates, the validation results 138 pertaining to images associated with false positives and/or false negatives may be stored. Over time, analysis may be applied to the data regarding false positive and/or false negative events. In one embodiment, this may comprise a manual data mining process, through which common characteristics or features are identified and associated with the false positive and/or false negative events, but not true positive or negative events. Once these features are identified, improvements 140 can be introduced to the automatic recognition system 126 to reduce the proportion of false positives and/or false negatives. In another embodiment, the feedback module 132 may utilize a machine learning model to automatically analyze the stored data. The machine learning model may include, for example, one or more neural networks. The stored validation results 138 may be used as training data to continuously or periodically re-train the neural network(s) to improve the accuracy of the automatic recognition system 126. The feedback module 132 thus enables using "ground truth" from the process to adapt the classifier of the automatic recognition system 126. Although identified separately in FIG. 1, the feedback module 132 may be co-located with the automatic recognition system 126, and in some cases, may share common hardware.

Figure 4:
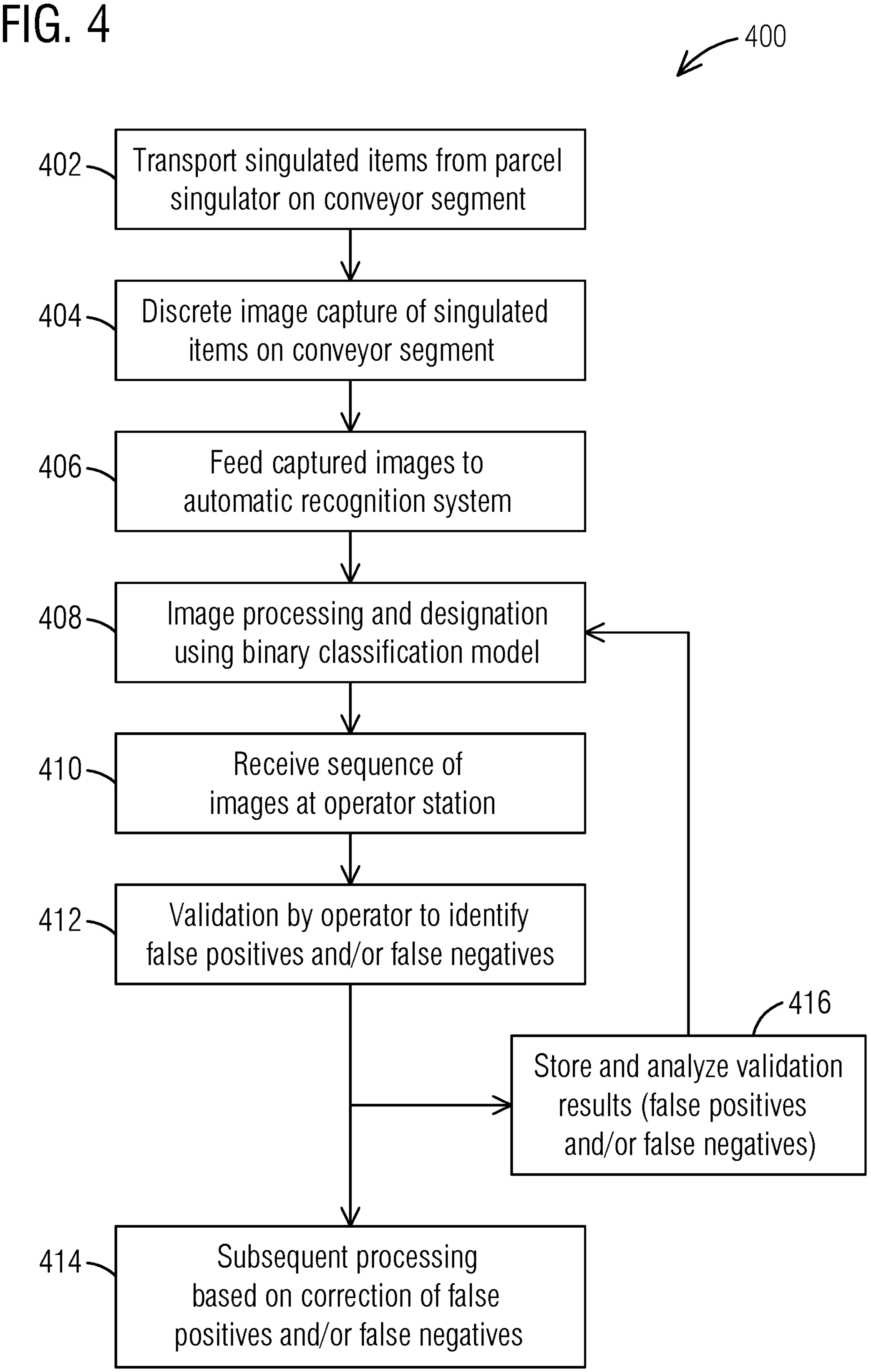
FIG. 4 is a flowchart illustrating a method for processing parcels according to an example embodiment.

FIG. 4 is a flowchart illustrating an example method 400 for processing parcels. FIG. 4 is not intended to indicate that the operational blocks of the method 400 are to be executed in any particular order, or that all of the blocks of the method 400 are to be included in every case. Additionally, the method 400 can include any suitable number of additional operations.

Block 402 involves transporting a stream of singulated items received from a parcel singulator on a conveyor segment. The singulated items on the conveyor segment may include both correctly and incorrectly singulated items received from the parcel singulator. In one embodiment, the conveyor segment has a length that accommodates a latency between the execution of block 404 and block 412 of the method 400.

Block 404 involves discretely capturing one or more images of each singulated item being transported on the conveyor segment. For each item, an image of at least one side and up to all six sides of the item may be captured.

Block 406 involves feeding the captured images, typically as digital image data comprising pixel information, to an automatic recognition system.

At block 408, the automatic recognition system performs image processing and uses one or more binary classification models to generate a classier output for each image, designating each image as a positive, representing a singulation error, or as a negative, representing a correct singulation. The one or more classification models may be tuned to a discrimination threshold setting that results in a high detection rate at the expense of a high false positive rate. In one embodiment, the one or more classification models may be used at a discrimination threshold setting that is above a knee-point in the ROC curve associated with the respective classification model.

Block 410 involves selectively receiving a sequence of designated positive images at an operator station. In one embodiment, a confidence level is determined by the automatic recognition system for each "positive" classifier output, wherein the sequence of designated positive images received at the operator station consists of images for which the classifier output is positive with a confidence level below a threshold confidence level. In another embodiment, the sequence of designated positive images received at the operator station consists of all images for which the classifier output is positive.

Block 412 involves visual validation of the images received at the operator station by a human operator, to identify false positives and/or false negatives therefrom.

Block 414 involves subsequent processing of the singulated items based on the correction of false positives and/or false negative. Items associated with images that are identified as false positives at the operator station are processed as correctly singulated items and may be allowed to proceed to subsequent processing, such as sorting. Items associated with images for which the classifier output is validated as true positive and/or false negative at the operator station may be extracted from the stream of singulated items by an exception handling system located downstream of the conveyor segment.

A further operational block 416 may comprise storing and providing analyses of classifier outputs that are identified as false positives and/or false negatives at the operator station, for development and/or tuning of the automatic recognition system. In one embodiment, a machine learning model may be used for providing said analyses.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the claims.

What is claimed is:

1. A parcel processing system, comprising:

a conveyor segment configured to transport a stream of singulated items received from a parcel singulator;

an imaging device configured to discretely capture an image of each singulated item of the stream of singulated items transported on the conveyor segment;

an automatic recognition system configured to process the captured images and utilize a binary classification model to generate a classifier output designating each image as a positive, representing a singulation error, or as a negative, representing a correct singulation; and an operator station configured to selectively receive a sequence of images from the automatic recognition system to enable an operator to validate the classifier output for the received images, for identifying false positives and/or false negatives therefrom;

the parcel processing system being configured to process items associated with images that are identified as false positives at the operator station as correctly singulated items and/or to process items associated with images that are identified as false negatives at the operator station as incorrectly singulated items.

2. The parcel processing system according to claim 1, wherein the sequence of images received at the operator station consists only of designated positive images.

3. The parcel processing system according to claim 1, wherein the automatic recognition system is configured to utilize the binary classification model at a discrimination threshold setting that is above a knee-point in a receiver operating characteristic (ROC) curve associated with the binary classification model.

4. The parcel processing system according to claim 1, wherein the automatic recognition system is configured to utilize the binary classification model to determine a confidence level of the classifier output, and wherein the sequence of images received at the operator station consists only of images for which the classifier output has confidence level below a threshold confidence level.

5. The parcel processing system according to claim 1, further comprising:

an exception handling system located downstream of the conveyor segment and configured to automatically extract items associated with images for which the classifier output is validated as true positive and/or false negative at the operator station.

6. The parcel processing system according to claim 1, wherein the conveyor segment has a length which is configured to accommodate a latency between image capture and operator validation.

7. The parcel processing system according to claim 1, wherein the operator station is remotely located from the parcel singulator.

8. The parcel processing system according to claim 1, wherein the operator station is associated with multiple parcel singulators for validating singulation outputs thereof.

9. The parcel processing system according to claim 1, comprising a feedback module configured to store and provide analyses of classifier outputs that are identified as false positives and/or false negatives at the operator station, for development and/or tuning of the automatic recognition system.

10. The parcel processing system according to claim 9, wherein the feedback module is configured to utilize a machine learning model for providing said analyses.

11. A method for processing parcels, comprising:

transporting, on a conveyor segment, a stream of singulated items received from a parcel singulator;

capturing an image of each singulated item of the stream of singulated items transported on the conveyor segment;

feeding the captured images to an automatic recognition system, whereupon the automatic recognition system processes the captured images and utilizes a binary classification model to generate a classifier output designating each image as a positive, representing a singulation error, or as a negative, representing a correct singulation;

selectively receiving a sequence of images at an operator station for validating, by an operator, the classifier output for the received images, to identify false positives and/or false negatives therefrom; and processing items associated with images that are identified as false positives at the operator station as correctly singulated items and/or processing items with images that are identified as false negatives at the operator station as incorrectly singulated items.

12. The method according to claim 11, wherein the sequence of images received at the operator station consists only of designated positive images.

13. The method according to claim 11, wherein the binary classification model is utilized at a discrimination threshold setting that is above a knee-point in a receiver operating characteristic (ROC) curve associated with the binary classification model.

14. The method according to claim 11, wherein the binary classification model is utilized to determine a confidence level of the classifier output, and wherein the sequence of images received at the operator station consists only of images for which the classifier output has a confidence level below a threshold confidence level.

15. The method according to claim 11, further comprising:

extracting items associated with images for which the classifier output is validated as true positive and/or false negative at the operator station by an exception handling system located downstream of the conveyor segment.

16. The method according to claim 11, wherein the conveyor segment has a length which is configured to accommodate a latency between image capture and operator validation.

17. The method according to claim 11, wherein the operator station is remotely located from the parcel singulator.

18. The method according to claim 11, wherein the operator station is associated with multiple parcel singulators for validating singulation outputs thereof.

19. The method according to claim 11, further comprising:

storing and providing analyses of classifier outputs that are identified as false positives and/or false negatives at the operator station, for development and/or tuning of the automatic recognition system.

20. The method according to claim 19, comprising utilizing a machine learning model for providing said analyses.

* * * * *